(12) United States Patent
Perry

(10) Patent No.: US 8,967,637 B2
(45) Date of Patent: Mar. 3, 2015

(54) TAIL WHEEL TRANSPORTER

(71) Applicant: Daniel S. Perry, Chamdler, AZ (US)

(72) Inventor: Daniel S. Perry, Chamdler, AZ (US)

( * ) Notice: Subject to any disclaimer, the term of this patent is extended or adjusted under 35 U.S.C. 154(b) by 88 days.

(21) Appl. No.: 13/682,403

(22) Filed: Nov. 20, 2012

(65) Prior Publication Data

US 2013/0076004 A1 Mar. 28, 2013

Related U.S. Application Data

(63) Continuation-in-part of application No. 13/169,680, filed on Jun. 27, 2011, now Pat. No. 8,336,900.

(60) Provisional application No. 61/362,342, filed on Jul. 8, 2010.

(51) Int. Cl.
| | |
|---|---|
| *B62B 3/06* | (2006.01) |
| *B62B 3/12* | (2006.01) |
| *B60P 3/11* | (2006.01) |
| *B60S 13/00* | (2006.01) |
| *B64F 1/22* | (2006.01) |
| *B66F 1/00* | (2006.01) |

(52) U.S. Cl.
CPC . *B60P 3/11* (2013.01); *B60S 13/00* (2013.01); *B62B 3/0606* (2013.01); *B62B 3/0625* (2013.01); *B62B 3/0643* (2013.01); *B64F 1/22* (2013.01); *B66F 1/00* (2013.01); *B62B 3/12* (2013.01); *B62B 2202/90* (2013.01); *B62B 2203/10* (2013.01); *B62B 2202/031* (2013.01)
USPC ...................................... 280/79.4; 280/47.34

(58) Field of Classification Search
USPC ............ 280/476.1, 62, 79.4, 47.34; 180/19.1, 180/19.2, 19.3, 904; 244/50, 115; 414/428, 414/466, 463, 678
See application file for complete search history.

(56) References Cited

U.S. PATENT DOCUMENTS

| | | | |
|---|---|---|---|
| 1,902,834 A | | 3/1933 | Cohen-Venezian |
| 2,502,285 A | * | 3/1950 | Smith et al. ................ 254/10 R |
| 2,551,483 A | * | 5/1951 | Bartoe .......................... 414/428 |
| 2,822,944 A | * | 2/1958 | Blomgren .................... 414/458 |
| 3,049,253 A | * | 8/1962 | Cabral .......................... 414/428 |
| 5,071,151 A | | 12/1991 | Irwin |
| 5,449,266 A | * | 9/1995 | Evans .......................... 414/458 |
| 5,511,926 A | | 4/1996 | Iles |
| 6,186,728 B1 | * | 2/2001 | Michaud ...................... 414/458 |
| 6,536,709 B1 | | 3/2003 | McVaugh |
| 2006/0056949 A1 | | 3/2006 | Eckert |
| 2009/0104009 A1 | * | 4/2009 | Hamman ...................... 414/428 |
| 2012/0007335 A1 | * | 1/2012 | Perry ............................ 280/402 |

* cited by examiner

*Primary Examiner* — Frank Vanaman
(74) *Attorney, Agent, or Firm* — Keith L. Jenkins, Registered Patent Attorney, LLC; Keith L. Jenkins

(57) ABSTRACT

A tail wheel transporter with an off-center single-beam chassis in a tricycle carriage coupled to a towing arm. The single beam chassis pivotably supports a lifting foot member of a four bar mechanism that is side mounted on the single-beam chassis. The lifting foot supports two studs, one fixed and one adjustable, for engaging a tail wheel. The lifting arm is coupled to the four bar mechanism and is manually operated to lift the tail wheel off the ground. In the lifted position, the lifting arm is latched to the towing arm so that constant manual force to maintain lift is not required. The tail wheel is received on the studs between the front and rear axles and exerts force below the height of the rear axle, so no manual force is required to maintain balance during operation. A low-profile bifurcated front wheel allows use under low-hanging vehicle parts.

20 Claims, 15 Drawing Sheets

TAIL WHEEL TRANSPORTER

RELATED APPLICATIONS

This application is a continuation-in-part of U.S. patent application Ser. No. 13/169,680 filed Jun. 27, 2011 (issued as U.S. Pat. No. 8,336,900) by the same inventor which, in turn, claims the benefit of U.S. Provisional Patent Application 61/362,342 filed Jul. 8, 2010 by the same inventor.

FIELD OF THE INVENTION

This invention relates to a device for moving an aircraft having tail wheel while the aircraft is on the ground. The invention further relates to a lever jack on a dolly.

BACKGROUND

In general aviation, it is sometimes necessary to move aircraft on an aircraft hanger floor or on a tarmac without powering up the aircraft engine. For aircraft equipped with tail wheels (hereinafter "tail wheel aircraft"), it is generally preferred to move the aircraft by grasping the tail and then pushing, pulling, and/or turning the aircraft. Depending on the weight and design of the tail wheel aircraft, this may be a strenuous task. The tail of a tail wheel aircraft is the location of several of the aircraft's control surfaces. Pushing or pulling of these control surfaces for the purpose of ground movement is generally not recommended and could cause damage that could result in loss of control of the aircraft while in flight.

US Patent Application Publication Number 20060056949 A1 published 2006 Mar. 16 on behalf of Eckert for a TRANSPORT VEHICLE FOR AIRCRAFT discloses a tricycle wheel arrangement on a bifurcated chassis that receives the aircraft wheel between the axles. The two drive wheels (or tracks) are independently driven for steering. As a motorized system, Eckert's invention is very heavy, very complex, and expensive.

U.S. Pat. No. 5,071,151 issued 1991 Dec. 10 to Irwin for a TAIL WHEEL AIRCRAFT DOLLY discloses a two-wheeled dolly with two-arms, positioned on a handle, for receiving the tail wheel from the side. The long handle from the axle is used to lift and balance the tail of the aircraft during movement. Constant manual force must be applied to the handle to maintain lift and balance.

U.S. Pat. No. 1,902,834 issued on 1933 Mar. 28 to Cohen-Venezian for a TAIL-SUPPORTING TRUCK FOR AEROPLANES discloses the use of two wheels on a single axle with a cup or support for receiving a tail wheel above the axle. An elongated handle coupled to the axle requires constant force to be manually applied to maintain balance during operation.

U.S. Pat. No. 5,511,926 issued 1996 Apr. 30 to Iles for MOVEMENT OF AIRCRAFT discloses a two-axle bifurcated chassis on a self-propelled dolly. Two drive wheels are on opposite sides of the bifurcated chassis and a closely set pair of wheels is pivotably mounted to the chassis and directed by manual operation of an elongated handle. The tail wheel to be lifted is engaged between the bifurcated chassis members. Being motorized and battery powered, Iles' invention is heavy and expensive.

U.S. Pat. No. 6,636,709 B1 issued 2003 Mar. 25 to McVaugh for a SMALL AIRCRAFT POWER TUG discloses a two-wheel assembly with arms for engaging the nose wheel axle and a drive wheel. The drive wheel is powered by a power drill through a drive train in the elongated handle. McVaugh does not lift the nose wheel, but can tilt the dolly to a tricycle configuration when not engaged with an aircraft for free wheeling.

U.S. Pat. No. 4,854,803 issued on 1989 Aug. 8 to Coccaro for an APPARATUS AND METHOD FOR JACKING AND DOLLYING AN AFFIXED VEHICLE WHEEL ASSEMBLY discloses a four-castered U-shaped chassis with an elongated handle. The casters are attached on chassis members with dual-angled ends. The U-shaped chassis engages a wheel from the side.

Therefore, a need exists for a tail wheel transporter that is lightweight and does not require the application of constant manual force to maintain lift or balance. A need also exists for a tail wheel transporter that is easy to steer. A need also exists for a tail wheel transporter that is adaptable to tail wheels of various widths. A need exists for a tail wheel transporter that can be manufactured in various sizes and strengths for retaining tail wheels and aircraft of various masses. A need also exists for a tail wheel transporter that can be adapted to lift tail wheels of various diameters. A need also exists for a tail wheel transporter that is inexpensive to manufacture and ship. A need also exists for a tail wheel transporter that allows ground transport of an aircraft without touching or damaging the control surfaces of the aircraft.

OBJECTS AND FEATURES OF THE INVENTION

A primary object and feature of the present invention is to overcome the above-mentioned problems and fulfill the above-mentioned needs.

Another object and feature of the present invention is to provide a tail wheel transporter that is lightweight and does not require the application of constant manual force to maintain lift or balance. Another object and feature of the present invention is to provide a tail wheel transporter that is easy to steer. Another object and feature of the present invention is to provide a tail wheel transporter that is adaptable to tail wheels of various widths. Another object and feature of the present invention is to provide a a tail wheel transporter that can be manufactured in various sizes and strengths for retaining tail wheels and aircraft of various masses. Another object and feature of the present invention is to provide a tail wheel transporter that can be adapted to lift tail wheels of various diameters. Another object and feature of the present invention is to provide a tail wheel transporter that is inexpensive to manufacture and ship.

It is an additional primary object and feature of the present invention to provide a tail wheel transporter that is safe, inexpensive, easy to clean, and handy. Another object and feature of the present invention is to provide a tail wheel transporter that allows ground transport of an aircraft without touching or damaging the control surfaces of the aircraft. Other objects and features of this invention will become apparent with reference to the following descriptions.

SUMMARY OF THE INVENTION

In accordance with a preferred embodiment hereof, the present invention provides a tail wheel transporter including: a tricycle carriage further including a main frame extending off-centered from a rear axle to a front caster attachment plate; a pivot bar pivotably mounted to a side of the main frame proximate a centerline orthogonal to the rear axle; a lifting foot pivotably coupled to the pivot bar and extending horizontally, when in a quiescent state, from the pivot bar to a point behind the front caster attachment plate, where the main frame, the pivot bar, and the lifting foot are three bars of a four bar mechanism; a lifting arm extending from the pivot bar; a towing arm extending from the main frame; and a latch operable to releasably couple the lifting arm to the towing arm when the lifting arm is in a lifted position. The tail wheel transporter, further including a biasing mechanism operable to bias the lifting foot toward a non-lifted position. The tail wheel transporter, further including a fourth bar of the four bar mechanism pivotably coupled on first and second ends to the main frame and the lifting foot, respectively. The tail wheel transporter, where the lifting foot further includes a first stud extending sideways from the lifting foot across the centerline. The tail wheel transporter, where the first stud further includes an axle for one pivotable coupling of the four bar mechanism. The tail wheel transporter, where the lifting foot further includes a second stud extending sideways from the lifting foot across the centerline and having an adjustable position on the lifting foot. The tail wheel transporter, where the adjustable position includes a slider mechanism operable to adjust the position of the second stud at various positions along a slot of the slider mechanism. The tail wheel transporter, where the slider mechanism includes: the slot along at least a portion of a centerline-proximal side of the lifting foot; an axial channel within the lifting foot; a slider block operable to slide within the axial channel, where the slider block includes: a first threaded bore alignable to the slot and operable to receive a threaded end of the second stud; and a second threaded bore alignable to the slot and operable to receive a set screw. The tail wheel transporter, where the tail wheel transporter is configured to receive the force of a wheel to be transported on the first and second studs of the lifting foot at a vertical position below the rear axle when the lifting foot is in a lifted position. The tail wheel transporter, where the four bar mechanism includes a parallelogram configuration. The tail wheel transporter, where the tricycle carriage includes a bifurcated front wheel. The tail wheel transporter, where the lifting arm includes first and second releasable and re-connectable sections. The tail wheel transporter, where the towing arm includes first and second releasable and re-connectable sections.

A tail wheel transporter including: a tricycle carriage further including a main frame extending off-centered from a rear axle to a front caster attachment plate and a bifurcated front wheel; a pivot bar pivotably mounted to a side of the main frame proximate a centerline orthogonal to the rear axle; a lifting foot pivotably coupled to the pivot bar and extending horizontally, when in a quiescent state, from the pivot bar to a point behind the front caster attachment plate, where the main frame, the lifting foot, and the pivot bar comprise three bars of a four bar mechanism; a lifting arm extending from the pivot bar; a towing arm extending from the main beam; a latch operable to releasably couple the lifting arm to the towing arm when the lifting arm is in a lifted position; the lifting foot including a first stud extending sideways across the centerline from the lifting foot; the lifting foot including a second stud extending sideways from the lifting foot across the centerline and having an adjustable position on the lifting foot; and where the tail wheel transporter is configured to receive the force of a wheel to be transported on the first and second studs of the lifting foot at a vertical position below the rear axle when the lifting foot is in a lifted position. The tail wheel transporter, where the adjustable position includes a plurality of threaded bores in the lifting foot, where each bore of the plurality of threaded bores is operable to receive a threaded end of the second stud; and/or a slider mechanism operable to adjust the position of the second stud at various positions along a slot of the slider mechanism. The tail wheel transporter, where the slider mechanism includes: the slot along at least a portion of a centerline-proximal side of the lifting foot; an axial channel within the lifting foot; a slider block operable to slide within the axial channel, where the slider block includes: a first threaded bore alignable to the slot and operable to receive a threaded end of the second stud; and a second threaded bore alignable to the slot and operable to receive a set screw. The tail wheel transporter, where the four bar mechanism further includes a fourth bar pivotably coupled at a first end to the main frame and pivotably coupled at a second end to a front end of the lifting foot.

A tail wheel transporter including: a tricycle carriage further including a main frame extending off-centered from a rear axle to a front caster attachment plate; a pivot bar pivotably mounted to a side of the main frame proximate a centerline orthogonal to the rear axle; a lifting foot pivotably coupled to the pivot bar as two bars of a four-bar mechanism; a biasing mechanism operable to bias the lifting foot toward a non-lifted position; a lifting arm extending from the pivot bar; a towing arm extending from the main beam; a latch operable to releasably couple the lifting arm to the towing arm when the lifting arm is in a lifted position; where the lifting foot includes a first stud extending sideways from the lifting foot across the centerline; where the lifting foot further includes a second stud extending sideways from the lifting foot across the centerline and having an adjustable position on the lifting foot; and where the tail wheel transporter is configured to receive the force of a wheel to be transported on the first and second studs of the lifting foot at a vertical position below the rear axle when the lifting foot is in a lifted position. The tail wheel transporter, where the adjustable position includes a plurality of threaded bores in the lifting foot, where each bore of the plurality of threaded bores is operable to receive a threaded end of the second stud; and/or a slider mechanism operable to adjust the position of the second stud at various positions along a slot of the slider mechanism; where the slider mechanism includes: the slot along at least a portion of a centerline-proximal side of the lifting foot; an axial channel within the lifting foot; a slider block operable to slide within the axial channel, where the slider block includes: a first threaded bore alignable to the slot and operable to receive a threaded end of the second stud; and a second threaded bore alignable to the slot and operable to receive a set screw. The tail wheel transporter, where the tricycle carriage includes a bifurcated front wheel.

BRIEF DESCRIPTION OF THE DRAWINGS

The above and other objects and advantages of the present invention will become more apparent from the following description taken in conjunction with the following drawings in which.

DETAILED DESCRIPTION OF THE BEST MODES AND PREFERRED EMBODIMENTS OF THE INVENTION

Figure 1:
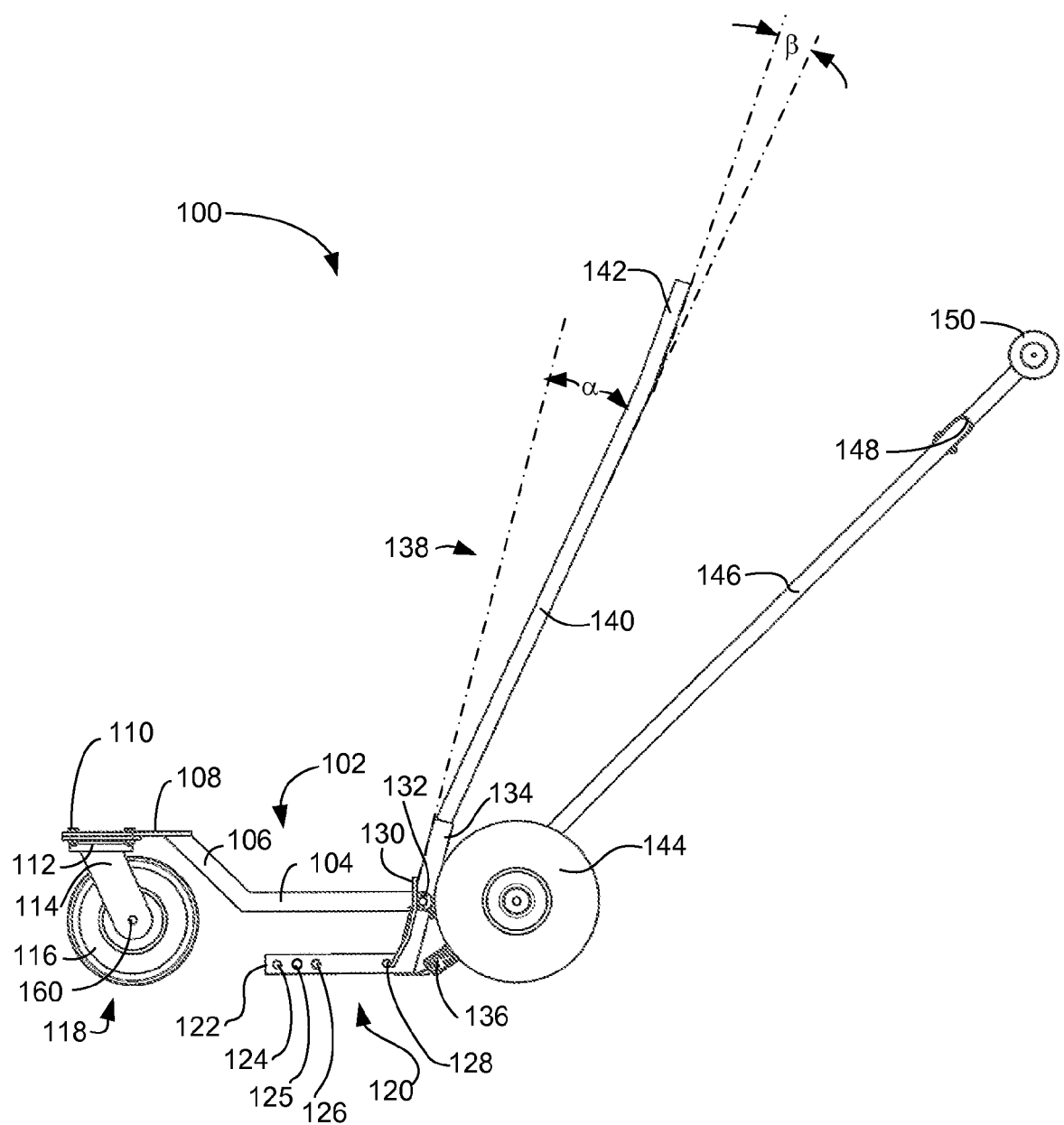
FIG. 1 is a side elevation view illustrating an exemplary tail wheel transporter, according to a preferred embodiment of the present invention.

FIG. 1 is a side elevation view illustrating an exemplary tail wheel transporter 100, according to a preferred embodiment of the present invention. Main frame 102 includes horizontal frame member 104 and angled frame extension 106. Horizontal frame member 104 supports elongated handle 146, axle 202 (see FIG. 2), and pivot 132. Angled frame extension 106 supports caster attachment plate 108. Main frame 102 is preferably made of substantially rigid material, such as steel or aluminum. In various embodiments, various other materials may be used. For example, in an embodiment where weight is at a premium, such as a tail wheel transporter 100 designed to be transported in an aircraft, Boron-epoxy composite may be used. Those of skill in the art, illuminated by the present disclosure, will be aware of materials that are appropriate for various unique applications.

Caster attachment plate 108 is preferably welded to angled extension 106. In an alternate embodiment, main frame 102 and caster attachment plate 108 may be formed as a single piece. Caster 118 includes caster base plate 112, caster support arms 114 (one of two shown) and caster wheel 116. Caster 118 may be a commercial-off-the-shelf (COTS) product or may be specially made. Caster base plate 112 is releasably attached to caster support plate 108, illustrated here as using bolts 110 (one of four labeled, two visible). In various other embodiments, other means of attachment, such as clamps or various fasteners, may be used. In an alternate embodiment, caster base plate 112 may be permanently fixed to caster support plate 108. Caster wheel 116 and caster support arms 114 are free to swivel together about an axis through the caster base plate 112. In various other embodiments, various types of casters may be used.

Elongated handle 146 is made of substantially rigid material, and is preferably welded to horizontal frame member 104. In an alternate embodiment, elongated handle 146 may be releasably attached to horizontal frame member 104. In yet another alternate embodiment, elongated handle 146 may be made of a composite material. Elongated handle 146 supports latch 148, crossbar 210 (See FIG. 2), and handles 150 and 250 (See FIG. 2). Latch 148 is rotatable to latch lifting arm 138 when lifting arm 138 is moved proximate elongated handle 146. Latch 148 is preferably made of metal but may be made of plastic in an alternate embodiment. Handles 150 and 250 improve the operator's grip on the crossbar 210 on the elongated handle 146. Handles 150 and 250 may be COTS bicycle hand grips, for example. Elongated handle 146 may be made in releasable and re-connectable sections 1044 and 1046 (See FIG. 10) for a portable embodiment.

Rear wheels 144 and 244 (See FIG. 2) preferably include pneumatic tires and rotate with or on axle 202. Materials for rear wheels 144 and 244 may vary, depending on the application for various embodiments. For example, a studded tire may be useful for Arctic applications, while a tire with high heat resistance may be desired for Arizona tarmacs. Those of skill in the art, illuminated by the present disclosure, will be aware of tire material requirements for various operational environments. The diameter of rear wheels 144 and 244 and the vertical extent of caster 118 are selected to maintain horizontal frame member 104 in a substantially horizontal orientation and to provide ground clearance to lifting foot 120. Preferably, when the lifting foot 120 is in the lifted position, the point at which the force exerted by the weight on the tail wheel 902 is below axle 202. More preferably, when the lifting foot 120 is in the lifted position, the point at which the force exerted by the weight on the tail wheel 902 is below axle 202 and below caster axle 160. Rear wheels 144 and 244, as well as caster 118, axle 202, caster support plate 108, and the main frame 102, form a tricycle carriage.

Lifting foot 120 includes stud support 122 rigidly attached to pivot bar 134. Preferably, stud support 122 and pivot bar 134 are made as one piece. Preferably, stud support 122 has an axial channel 123 (See FIGS. 11-13). Stud support 122 supports stud 124, stud 128, attachment means for spring 136, holes 125 and 126 for a moveable stud 227 (See FIG. 2). Holes 125 and 126 are preferably threaded bores 125 and 126, the moveable stud 227 preferably has an end with complimentary threads to threaded bores 125 and 126. In alternate embodiments, other means for releasably attaching moveable stud 227 may be used. The studs 124 and 128 engage the aircraft tail wheel 902 (see FIG. 9) from the side and exert force on the tail wheel 902 when the tail wheel 902 is lifted. The holes 125 and 126 allow the moveable stud 227 to be placed to adjust for tail wheel 902 (See FIG. 9) size. Tire cradle 130 is rigidly attached to fixed stud 128 and operates to prevent the tail wheel 902 from rolling off the back of fixed stud 128. Tire cradle 130 may be of any shape and size operable to prevent the tail wheel 902 from rolling off the back of fixed stud 128.

Pivot bar 134 receives and rotates upon pivot 132, responsive to movement of lifting arm 138. Lifting arm 138 includes lifting beam 140 and handle 142. Beam 140 makes a 10° angle α with pivot bar 134, and handle 142 makes a 5° angle β with beam 140, as shown. The length of beam 140 and handle 142, as well as the placement of latch 148, are coordinated such that handle 142 may be latched in the lifted position. Angles α and β depend, in part, on the angle that elongated handle 146 makes with horizontal frame member 104 and the distance between the point of attachment of elongated handle 146 to horizontal frame member 104 and the pivot 132. In various additional embodiments, the angles α and β may vary with such factors, and α and/or β may be zero in some embodiments.

The tail wheel transporter 100 is shown in its quiescent state, as it is prior to lifting a tail wheel 902. In operation, a tail wheel 902 is engaged from the side on studs 124 and 128, or perhaps a moveable stud 227, and lifting arm 138 is manually pulled toward the elongated handle 146 and latched to elongated handle 146 using latch 148. The load is thus received between the front caster 118 and the rear wheel 144, and no additional manual force is required to maintain lift or balance while moving aircraft 900 (see FIG. 9).

Figure 2:
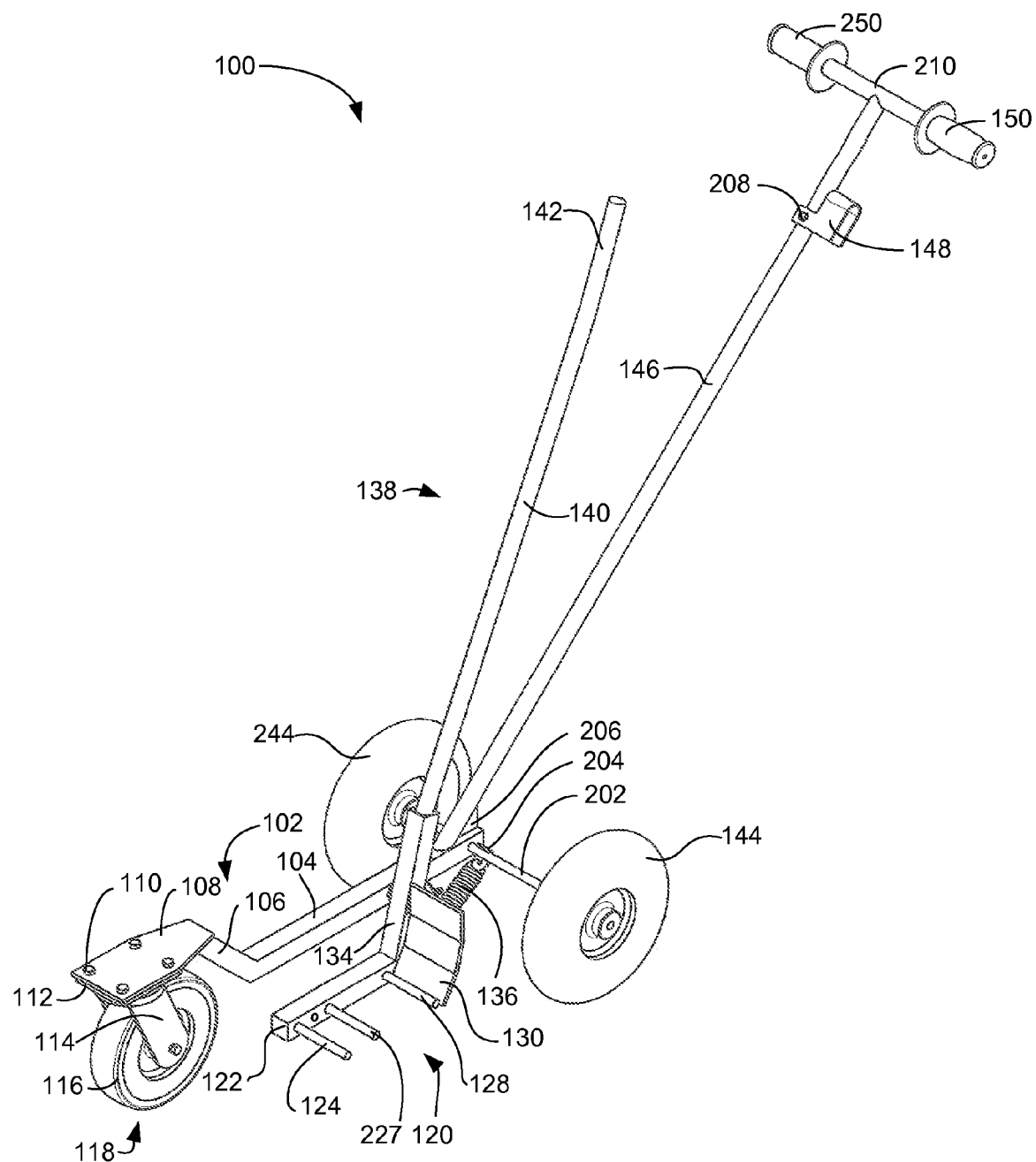
FIG. 2 is a front-left perspective view illustrating the exemplary tail wheel transporter, according to the preferred embodiment of FIG. 1.

FIG. 2 is a front-left perspective view illustrating the exemplary tail wheel transporter 100, according to the preferred embodiment of FIG. 1. Tail wheel transporter 100 is shown in its quiescent state. Axle 202 supports axle attachment 204 for spring 136, rear wheel 144, rear wheel 244, and main frame 102. Spring 136 biases the pivot bar 134, lifting foot 120, and lifting arm 138 towards the quiescent state, as shown. Moveable stud 227 is shown in position to assist with a lift. Latch pivot 208 is shown and latch 148 may be more clearly understood from this illustration. Elongated handle 146 terminates in a cross bar 210 that supports handles 150 and 250. Support flange 206 supports elongated handle 146 relative to horizontal frame member 104. The offset of main frame 102 on axle 202 may be more clearly understood by reference to FIG. 2. Note that both the main frame 102 and the lifting foot 120 are offset from the center of axle 202.

Figure 3:
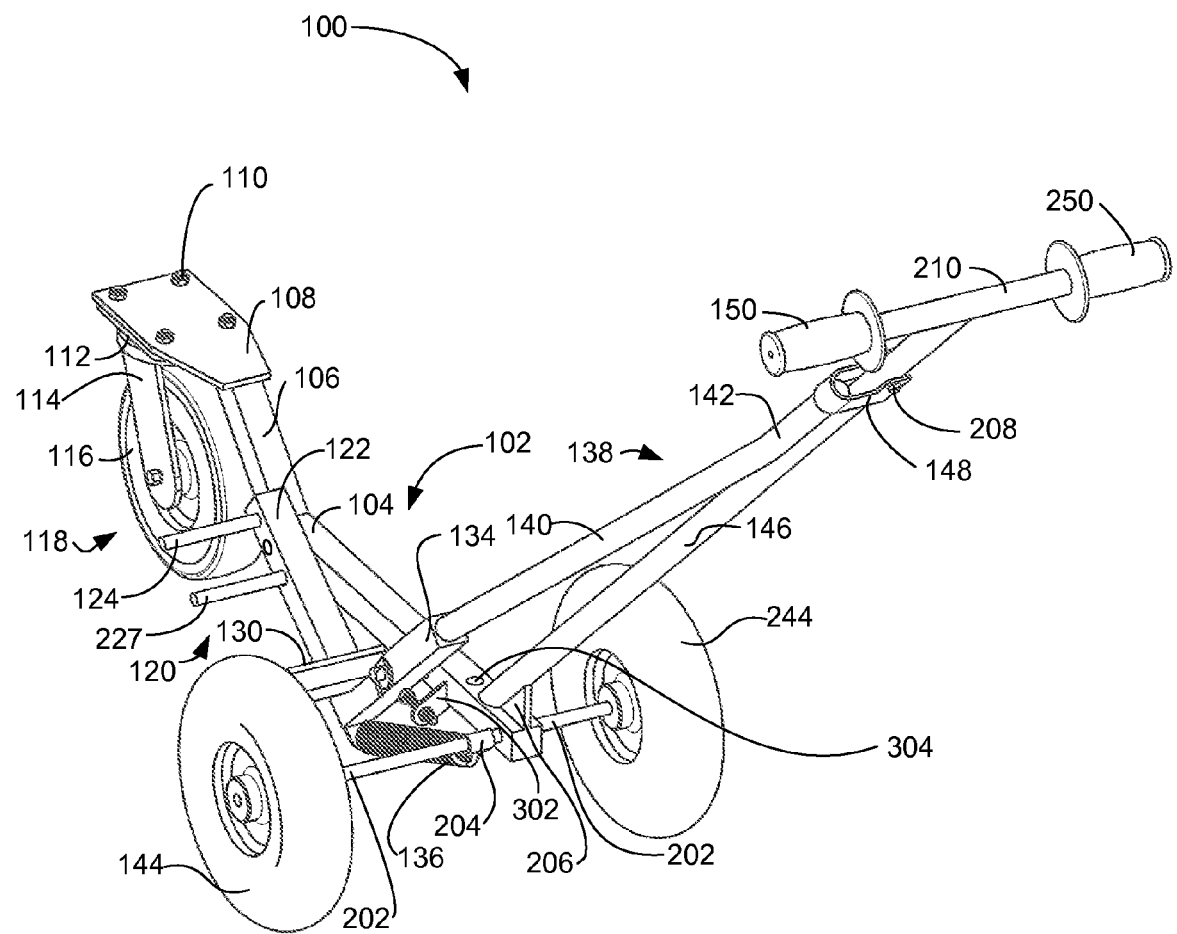
FIG. 3 is a rear-left perspective view illustrating the exemplary tail wheel transporter, according to the preferred embodiment of FIG. 1.

FIG. 3 is a rear-left perspective view illustrating the exemplary tail wheel transporter 100, according to the preferred embodiment of FIG. 1. The tail wheel transporter 100 is shown in its lifted state, with lifting arm 138 rotated back to elongated handle 146 and latched to elongated handle 146 by the manual pivoting of latch 148 about latch pivot 208. Lifting foot 120 is raised by the lever action of lifting handle 138 and pivot bar 134. Lifting arm stop 302 is illustrated as a flange attached to main frame 102 and a bolt through a threaded bore in the flange that can be turned to adjust the point at which the spring-biased downward travel of the lifting arm 138 stops. Bore 304, preferably a threaded bore, is for storage of moveable stud 227 when it is not in use.

Figure 4:
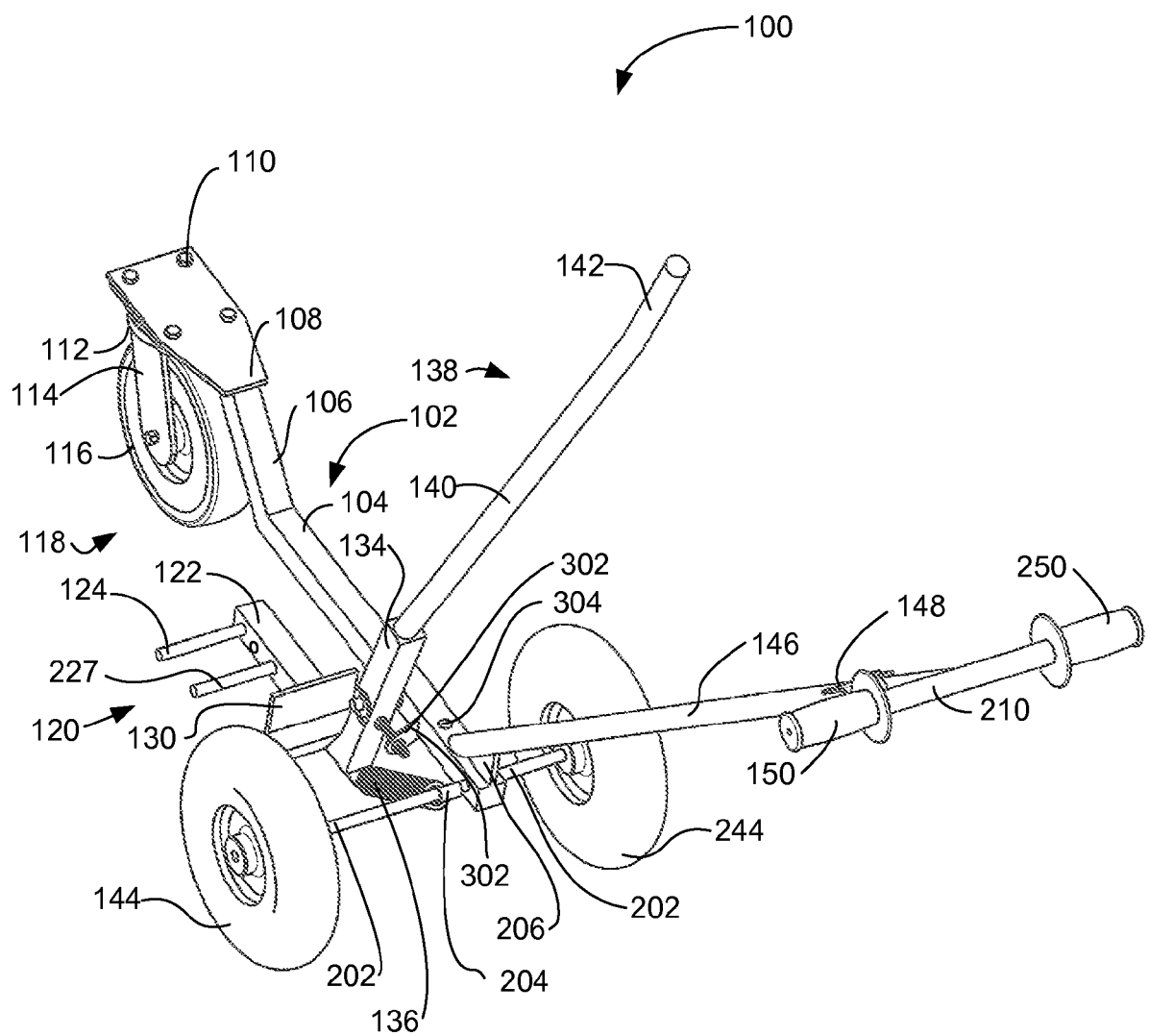
FIG. 4 is a top-left-rear perspective view illustrating the exemplary tail wheel transporter, according to the preferred embodiment of FIG. 1.

FIG. 4 is a top-left-rear perspective view illustrating the exemplary tail wheel transporter 100, according to the preferred embodiment of FIG. 1. The tail wheel transporter 100 is shown in its quiescent state. The pivot arm 134 is in contact with the lifting arm stop 302.

Figure 5:
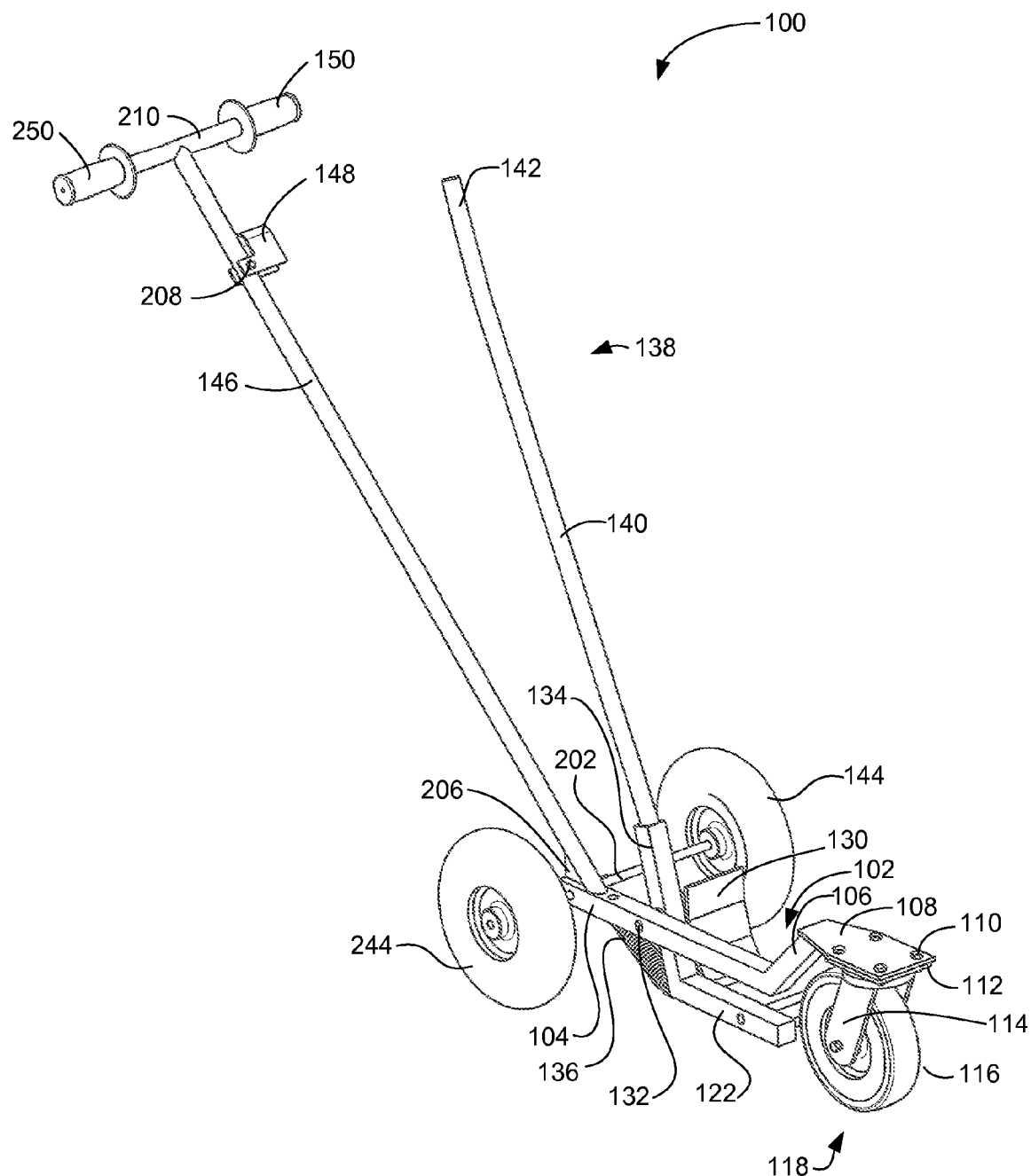
FIG. 5 is a front-right perspective view illustrating the exemplary tail wheel transporter, according to the preferred embodiment of FIG. 1.

FIG. 5 is a front-right perspective view illustrating the exemplary tail wheel transporter 100, according to the preferred embodiment of FIG. 1. The tail wheel transporter 100 is shown in its quiescent state.

Figure 6:
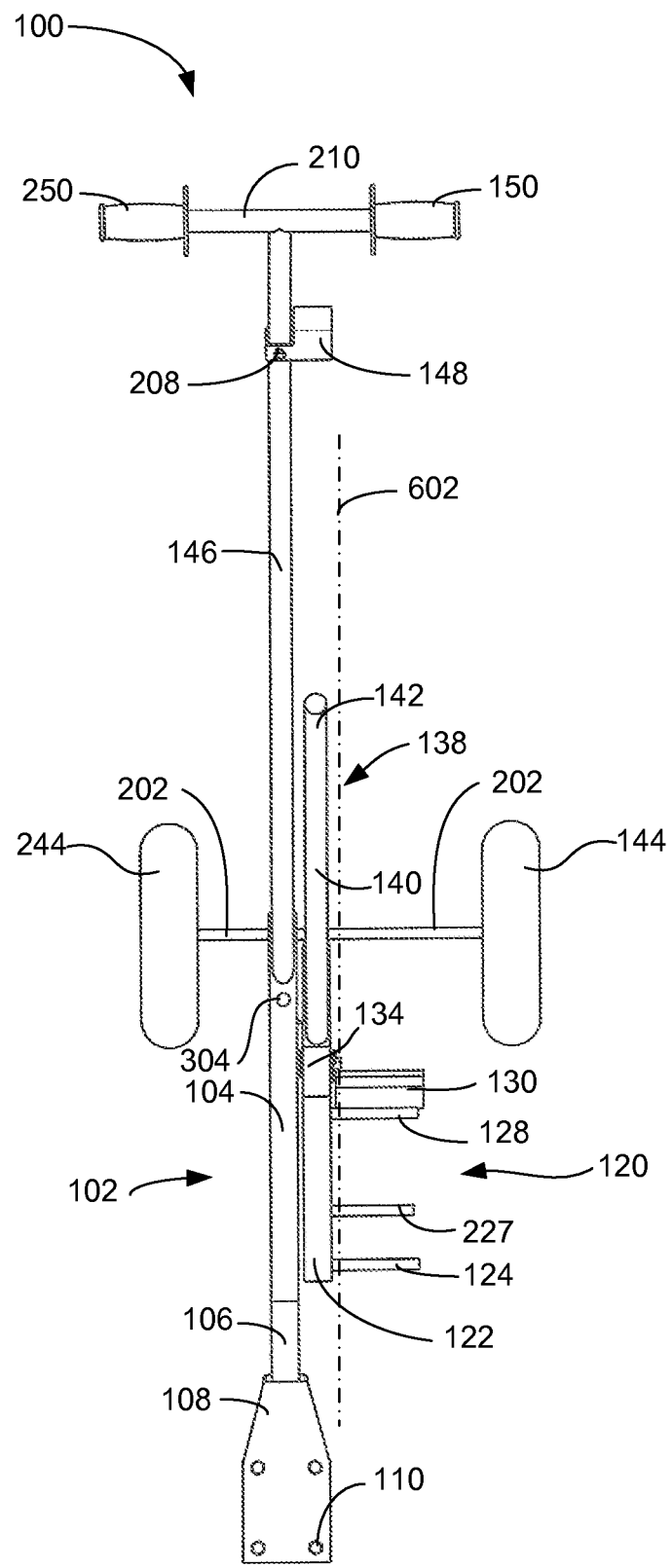
FIG. 6 is a top plan view illustrating the exemplary tail wheel transporter, according to the preferred embodiment of FIG. 1.

FIG. 6 is a top plan view illustrating the exemplary tail wheel transporter 100, according to the preferred embodiment of FIG. 1. The tail wheel transporter 100 is shown in its quiescent state. This view emphasizes that both the main frame 102 with elongated handle 146 and lifting foot 120, pivot bar 134, and lifting handle 138 are offset from the centerline 602 of axle 202. Studs 124, 227, and 128, as well as tire cradle 130 all extend through the centerline 602, meaning that the weight exerted by the tail wheel 902 is approximately centered side-to-side.

Figure 7:
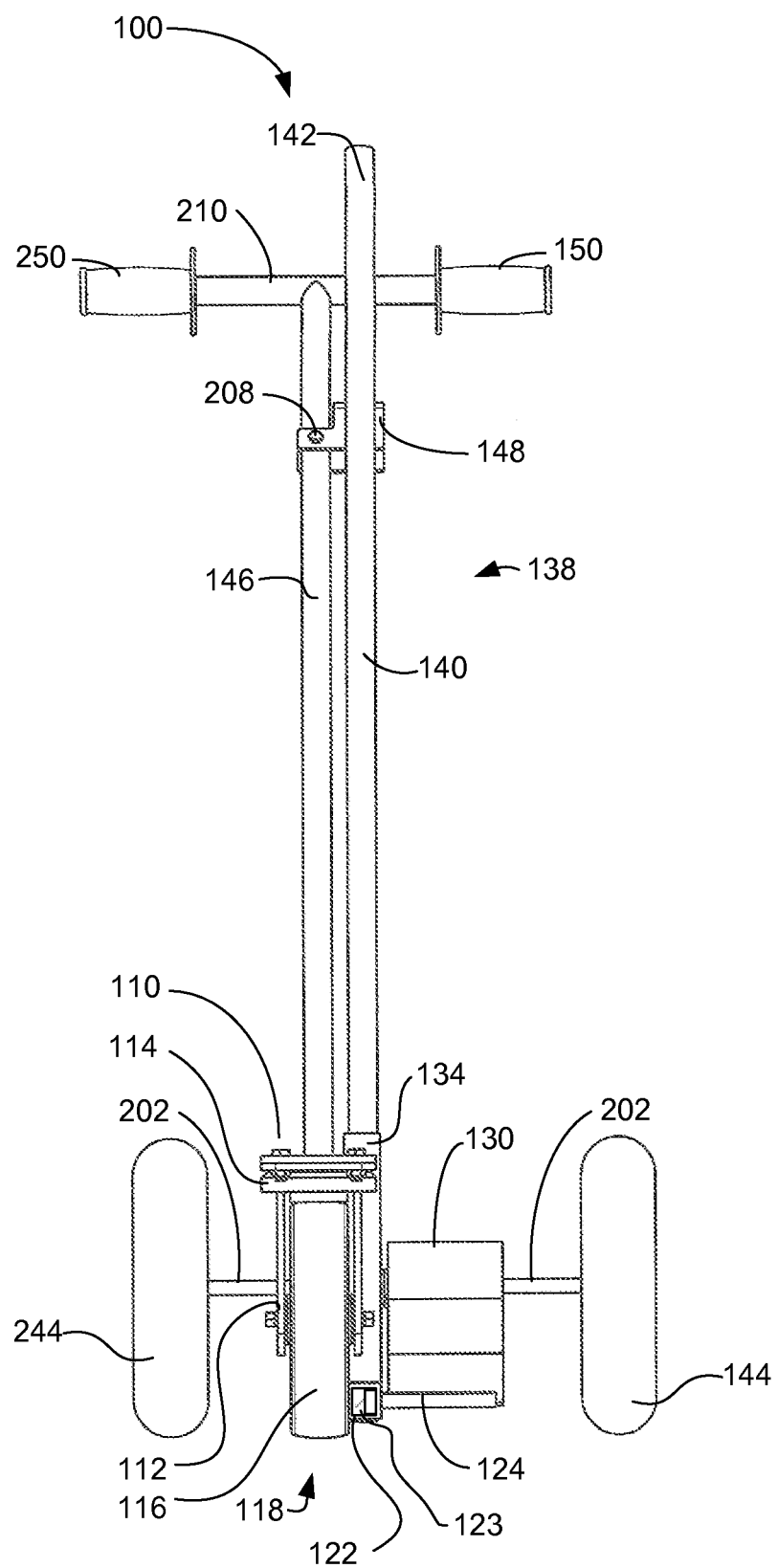
FIG. 7 is a front elevation view illustrating the exemplary tail wheel transporter, according to the preferred embodiment of FIG. 1.

FIG. 7 is a front elevation view illustrating the exemplary tail wheel transporter 100, according to the preferred embodiment of FIG. 1. The tail wheel transporter 100 is shown in its quiescent state.

Figure 8:
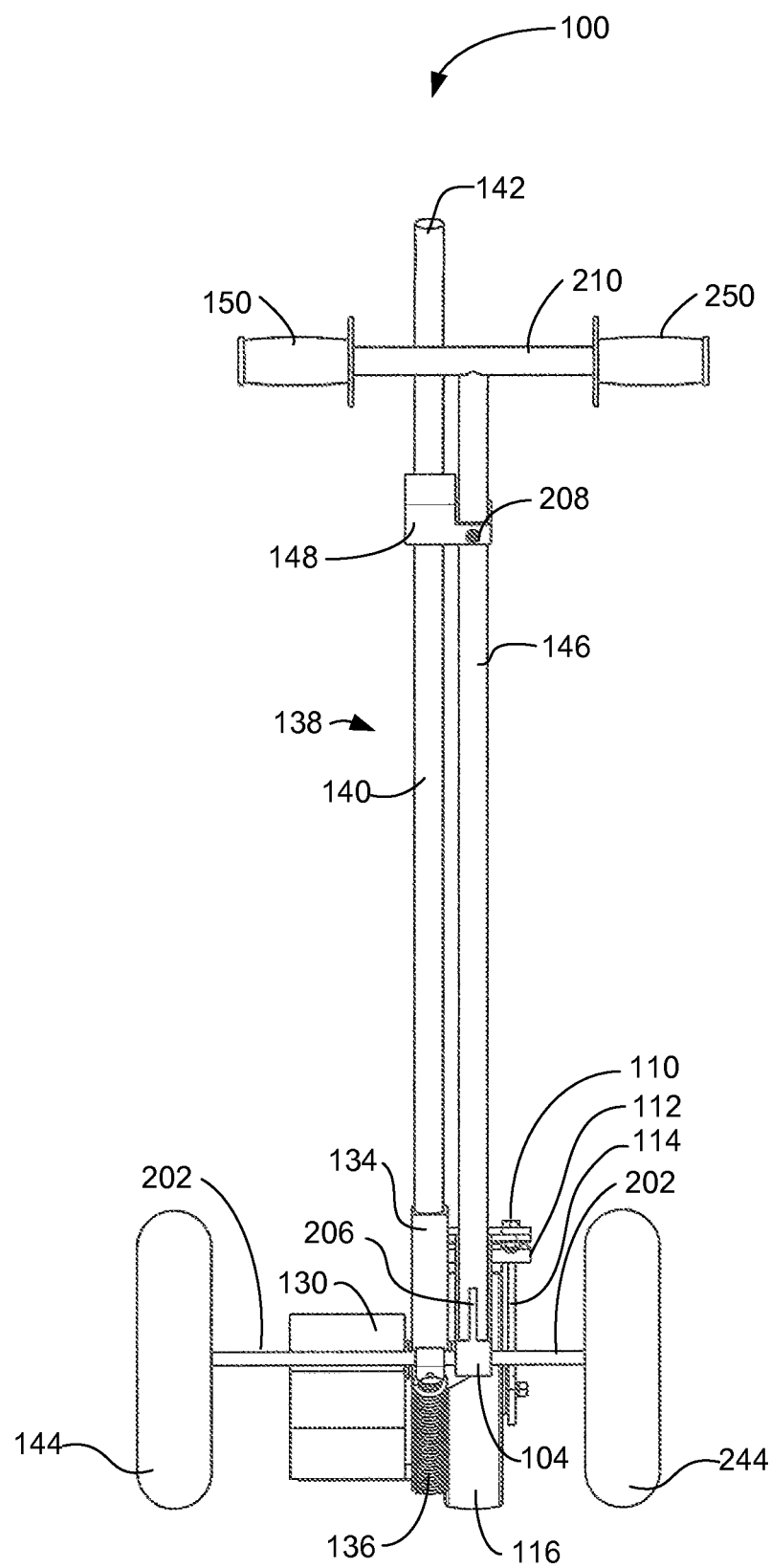
FIG. 8 is rear elevation view illustrating the exemplary tail wheel transporter, according to the preferred embodiment of FIG. 1.

FIG. 8 is rear elevation view illustrating the exemplary tail wheel transporter 100, according to the preferred embodiment of FIG. 1. The tail wheel transporter 100 is shown in its quiescent state.

Figure 9:
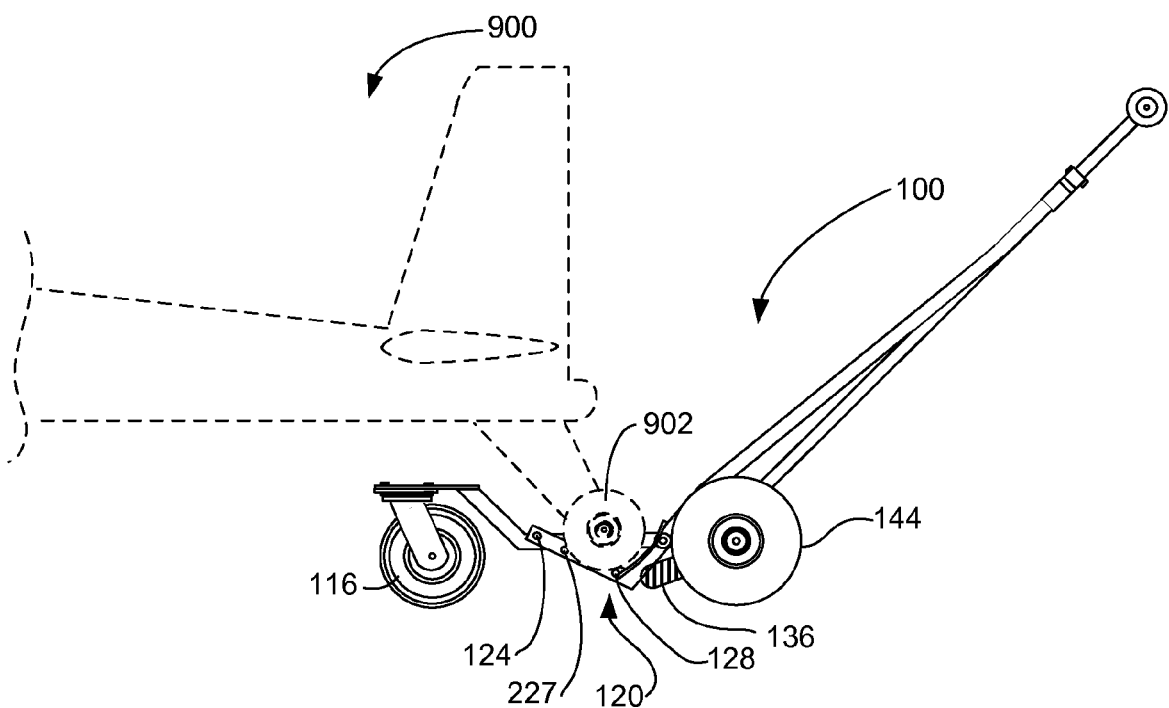
FIG. 9 is a left-side elevation view illustrating the exemplary tail wheel transporter, according to the preferred embodiment of FIG. 1.

FIG. 9 is a left-side elevation view illustrating the exemplary tail wheel transporter 100, according to the preferred embodiment of FIG. 1. The tail wheel transporter 100 is shown in its lifted state, with tail wheel 902 of aircraft 900 supported by fixed stud 128 and moveable stud 227. Latch 148 is latched, and the load is received between front and rear axles, making the lifted state a stable state.

Those of skill in the art, illuminated by the present disclosure, will appreciate that, while the example provided operates manually, the invention may also be implemented mechanically or hydraulically by merely replacing the manual force on the lifting arm 138 with a mechanical or hydraulic force. The force may be powered by electrical or other means. Likewise, embodiments made lightweight and more portable or more easily shippable are also within the scope of the present invention. Various embodiments of the invention may be equipped with a motorized system to propel the tail wheel transporter 100.

Figure 10:
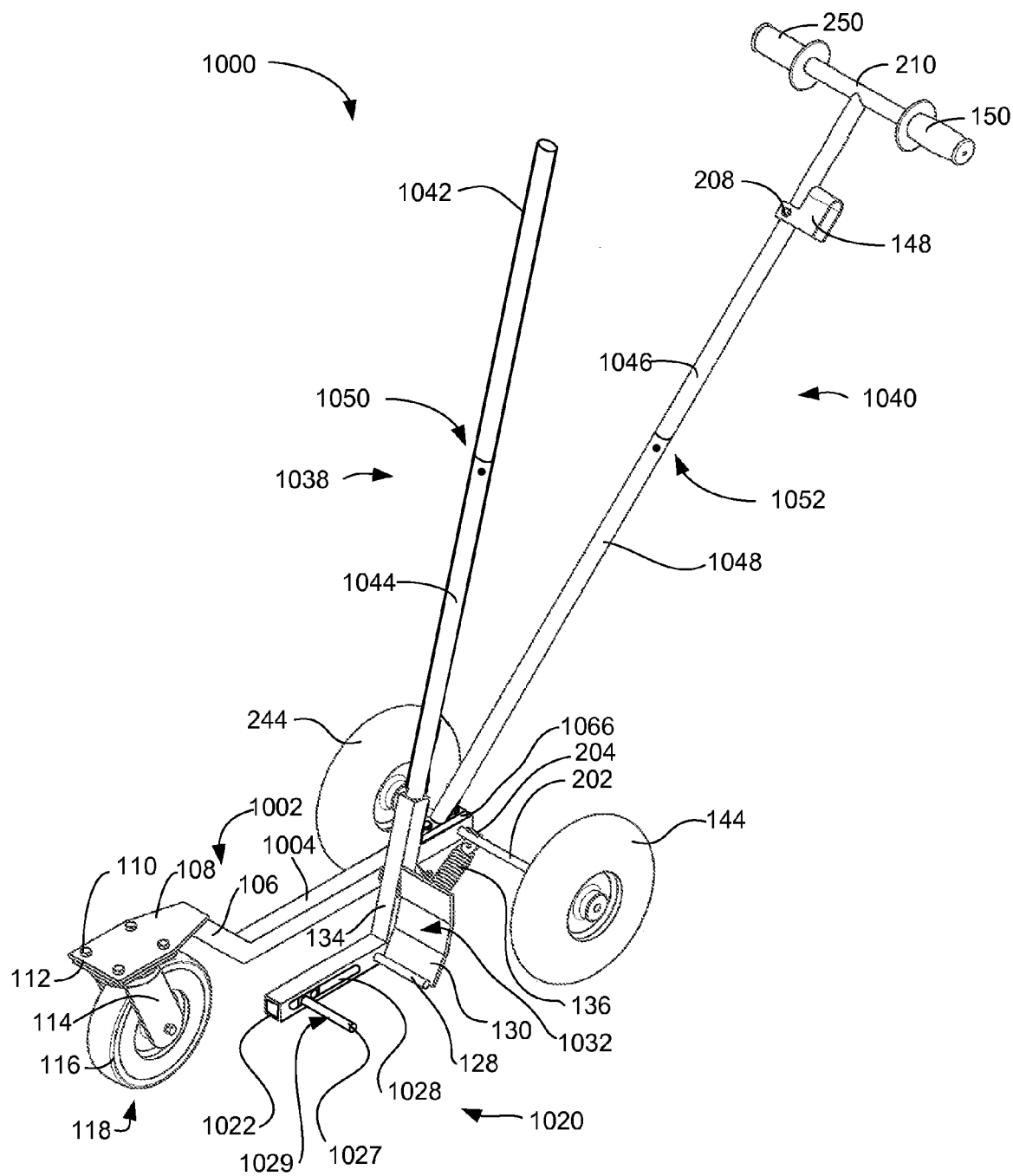
FIG. 10 is a front-left perspective view illustrating an exemplary tail wheel transporter, according to a second preferred embodiment of the present invention.

FIG. 10 is a front-left perspective view illustrating an exemplary tail wheel transporter 1000, according to a second preferred embodiment of the present invention. Tail wheel transporter 1000 has a lifting arm 1038 for which the angles α and β are zero. Lifting arm 1038 has first and second releasable and re-connectable sections 1042 and 1044 releasably joined with a telescoping rod and pin assembly 1050, allowing for disassembly for shipping. Towing arm 1040 has first and second releasable and re-connectable towing arm sections 1046 and 1048 releasably joined with a telescoping rod and pin assembly 1052, allowing for disassembly for shipping. Towing arm section 1048 is releasably affixed to main frame end member 1066, preferably in alignment with horizontal frame member 1004. Rear axle 202 extends through main frame 1004. Main frame 1002 includes horizontal frame member 1004 and angled frame extension 106. Horizontal frame member 1004 supports releasably attachable plate 1066 which is welded to the bottom end of second section 1048 of towing arm 1040 and bolted to main frame 1004.

Lifting foot 1020 includes stud support 1022 rigidly attached to pivot bar 134. Preferably, stud support 1022 and pivot bar 134 are made as one piece. Stud support 1022 includes stud 128, a slot 1028 from which protrudes stud 1027, a slider mechanism 1100 (See FIG. 11), and attachment means for spring 136. Attachment means for spring 136 may be a loop or other coupling for receiving or engaging and end portion of spring 136. The moveable stud 1027 preferably has an end with complimentary threads to the threaded bore 1106 (see FIG. 11) in the slider mechanism.

Surfaces 1029 and 1032 are preferably high-friction surfaces. For example, surfaces 1029 and 1032 may be covered with SAFETY-WALK™ adhesive tread made by the 3M Company of St. Paul, Minn.

Figure 11:
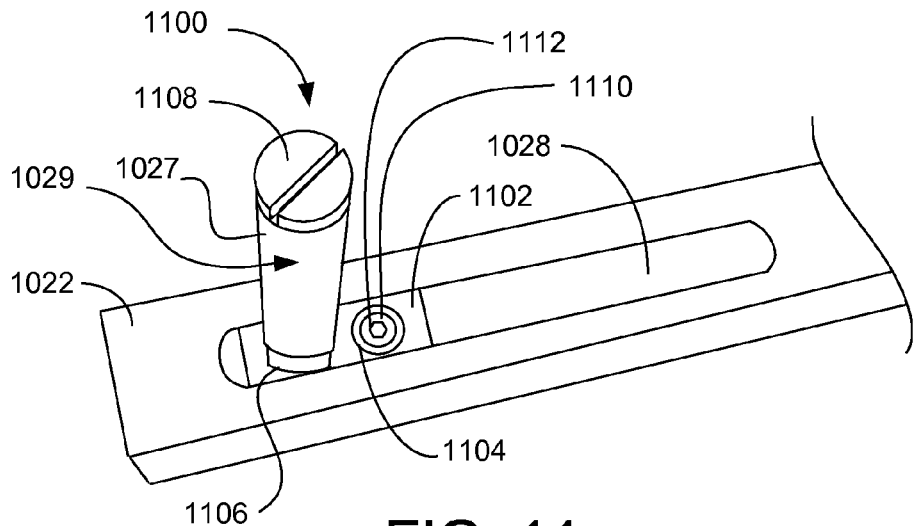
FIG. 11 is a front-right perspective view illustrating an exemplary an adjustable stud for an exemplary tail wheel transporter, according to a second preferred embodiment of the present invention as shown in FIG. 10.

FIG. 11 is a front-right perspective view illustrating an exemplary adjustable stud 1027 for an exemplary tail wheel transporter 1000, according to a second preferred embodiment of the present invention as shown in FIG. 10. Stud support 1022 is hollow and has a slot 1028 on one side through which stud 1027 protrudes. Slider block 1102 moves slidingly within hollow stud support 1022. Slider block 1102 has a first threaded bore 1106 into which complimentary threads at a first end of stud 1027 are threaded. A second end of stud 1027 has a driver receiver 1108 (illustrated as a screwdriver slot) for tightening stud 1027 in place. Slider block 1102 has a second threaded bore 1104 into which complimentary threads of a set screw 1110 are threaded. Set screw 1110 is preferably an Allen-head screw, but other driver receivers 1112, including unique driver receivers 1112, are within the scope of the invention. The slider mechanism 1100 includes the slot 1028, slider block 1102, set screw 1110, and stud 1027. Slider mechanism 1100 permits adjustment to any size tail wheel 902, and is not limited to accommodating discrete popular sizes. An Allen wrench or similar driver may be provided by the consumer or, in an alternate embodiment, may be supplied with tail wheel transporter 1000.

Figure 12:
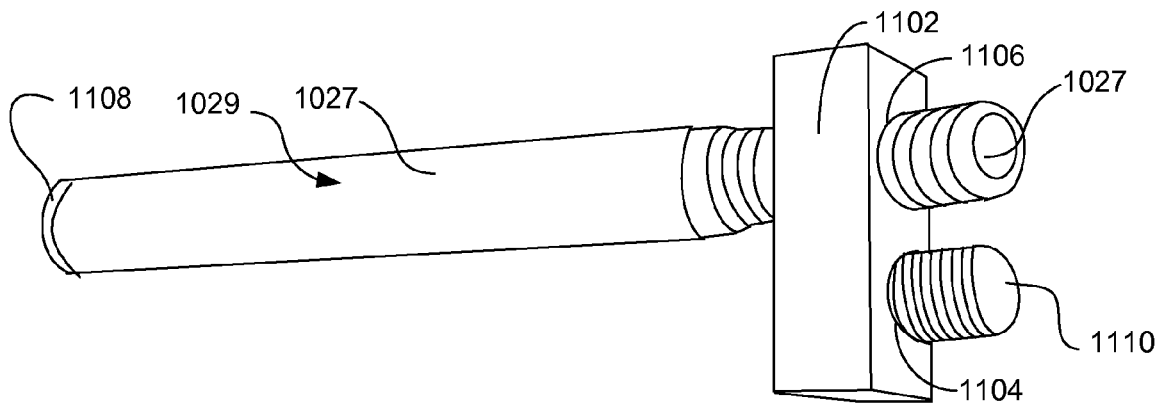
FIG. 12 is a rear-right perspective view illustrating an exemplary an adjustable stud for an exemplary tail wheel transporter, according to a second preferred embodiment of the present invention as shown in FIG. 10.

FIG. 12 is a rear-right perspective view illustrating an exemplary adjustable stud 1027 for an exemplary tail wheel transporter 1000, according to a second preferred embodiment of the present invention as shown in FIG. 10. Slider block 1102 is shown from the rear with the threads of stud 1027 protruding through the slider block 1102 and set screw 1110 also protruding through slider block 1102. This configuration, when achieved inside hollow stud support 1022, locks the stud 1027 and slider block 1102 from sliding within the hollow stud support 1022. Slider mechanism 1100 allows locking in various analog positions along the slot 1028 to accommodate tail wheels 902 of a wide range of sizes.

Figure 13:
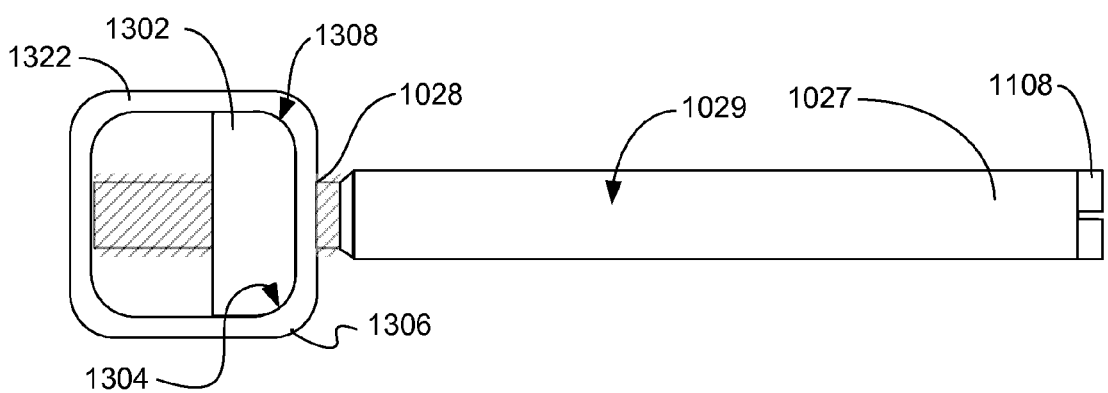
FIG. 13 is a side elevation view illustrating an additional exemplary stud support with an adjustable stud for an exemplary tail wheel transporter, according to a preferred embodiment of the present invention.

FIG. 13 is a side elevation view illustrating an alternate exemplary stud support 1322 with an adjustable stud 1027 for an exemplary tail wheel transporter, according to a preferred embodiment of the present invention. Stud support 1322 differs from stud support 1022 of FIG. 10 in that the outside corners 1306 (one of two labeled) and the inside corners 1304 (one of two labeled) of the stud support 1322 are rounded, whereas the stud support 1022 illustrated in FIG. 10 does not have rounded corners. The difference illustrates that, in various alternate embodiments, various internal and external cross-sectional shapes may be used for stud support 1322. Slider block 1302 is shown inside hollow stud support 1322 in the fully tightened position and is engaged by the threads of adjustable stud 1027 to assist in locking the slider block 1302 in place Slider block 1302 has conformally shaped corners 1308 (one of two labeled) that are received by inside rounded corners 1304 of stud support 1322. In various alternate embodiments, slider block 1302 has a shape at least partially conformal to the inside cross-sectional shape of the stud support 1322.

Figure 14:
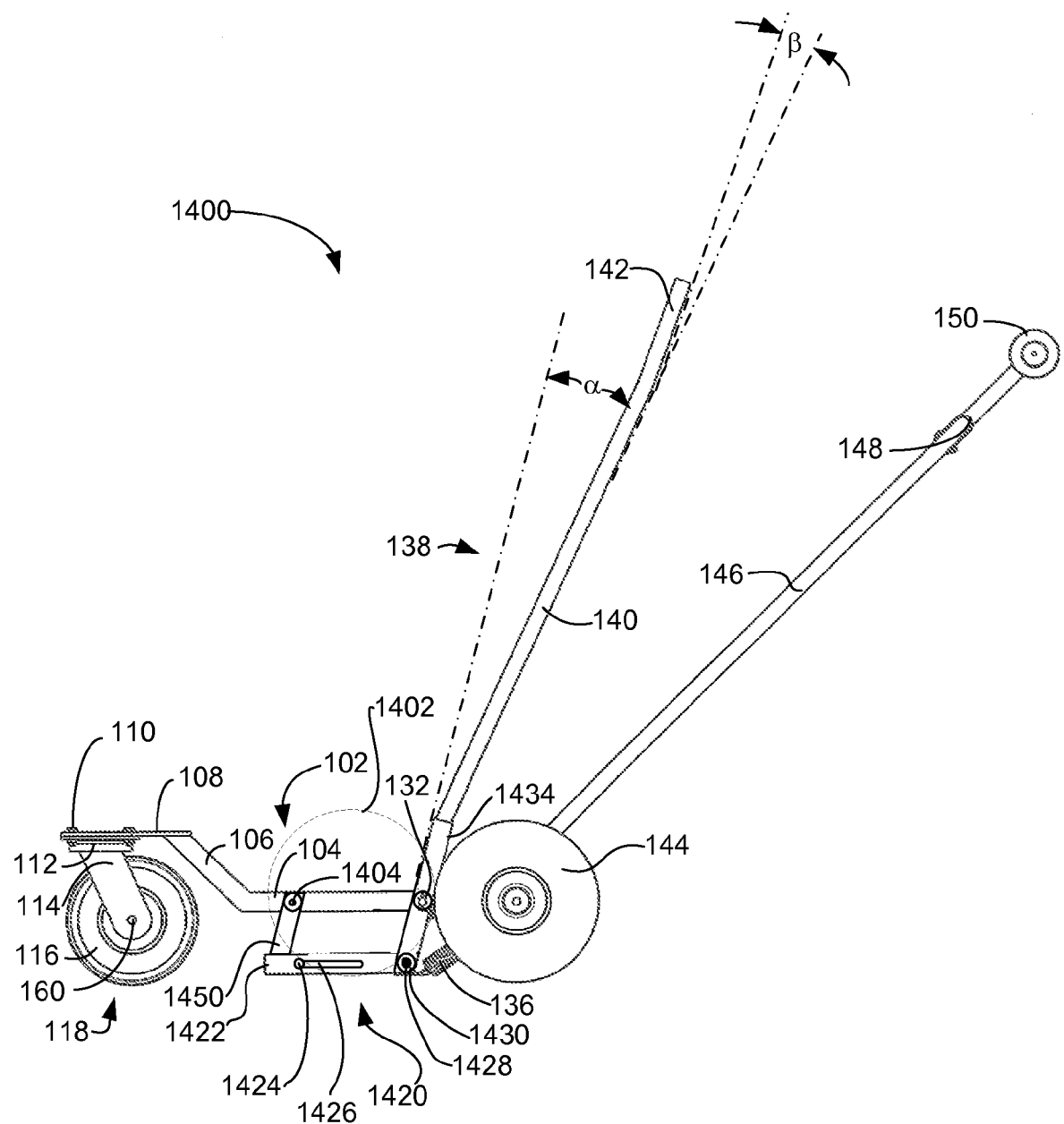
FIG. 14 is a side elevation view illustrating an additional exemplary embodiment of a tail wheel transporter, according to a preferred embodiment of the present invention.

FIG. 14 is a side elevation view illustrating an additional exemplary embodiment of a tail wheel transporter 1400, according to another preferred embodiment of the present invention. Tail wheel transporter 1400 is similar to tail wheel transporter 100 except tail wheel transporter 1400 uses a four-bar mechanism 104, 1434, 1422, and 1450 to implement lifting foot 1420. Pivot 1404 pivotably couples frame member 104 to a top end of free bar 1450. The bottom end of free bar 1450 is pivotably coupled (not visible in this view) to the forward end of stud support 1422. The rear end of stud support 1422 is pivotably coupled to pivot bar 1434 by pivot 1430. Pivot bar 1434 is pivotably coupled by pivot 132 to frame member 104, thereby completing the four-bar mechanism. When handle 142 is moved to rotate pivot bar about pivot 132, stud support 1422 moves upward with little or no tilting. Stud support 1422 supports one moveable stud 1424 that can be releasably fixed within slot 1426, as described in detail in regard to FIGS. 11-13, and one fixed stud 1428 that also serves as an axle for pivot 1430. Spring 136 attaches to the rear end of stud support 1422. In operation, a tail wheel 1402 rests on studs 1424 and 1428, is lifted or lowered by action of handle 142, and may be transported, along with the vehicle it is connected to, by manual operation of elongated handle 146. The remaining portions for tail wheel transporter 1400 are the same as tail wheel transporter 100.

Figure 15:
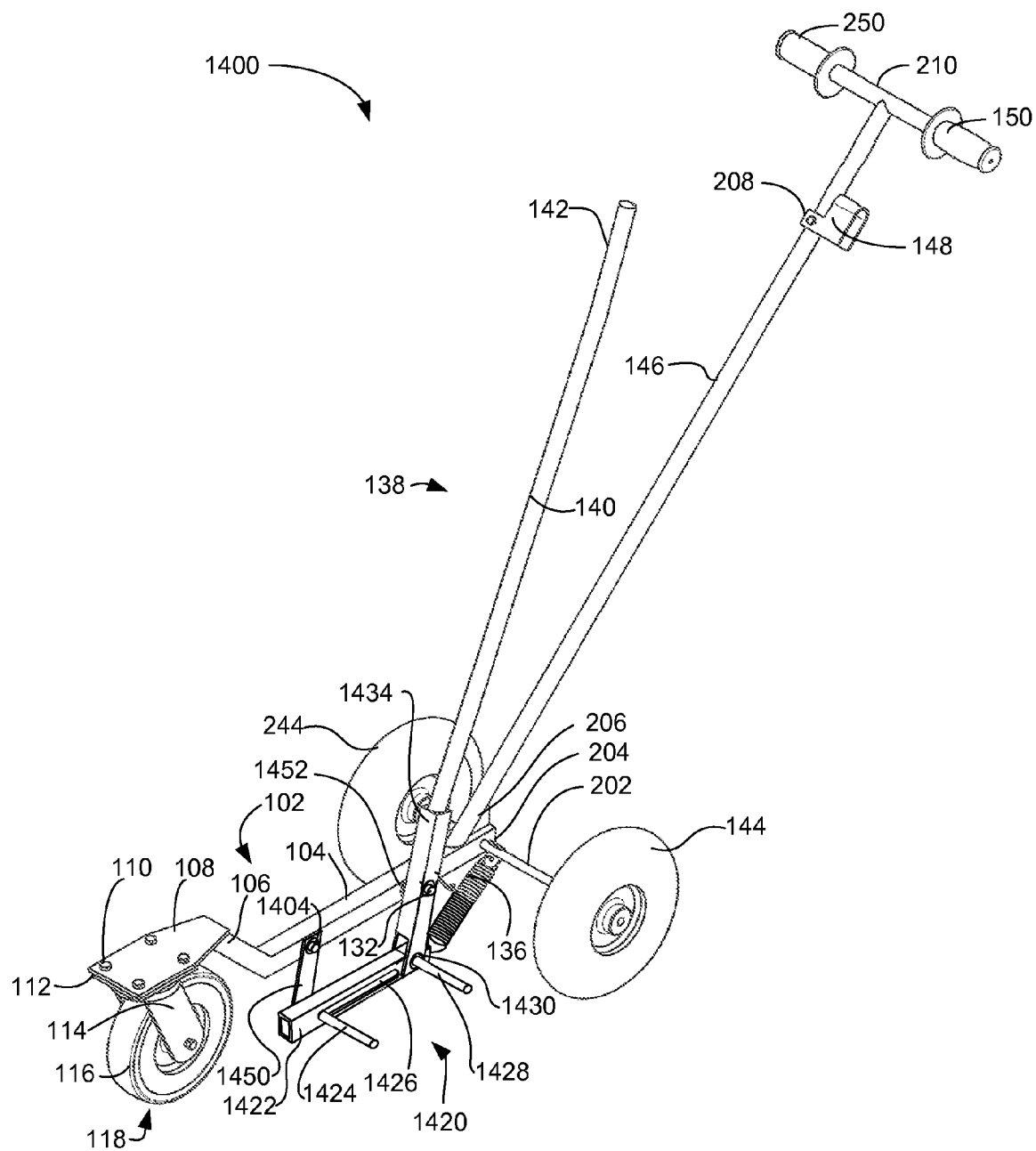
FIG. 15 is a front-left perspective view illustrating the exemplary embodiment for the exemplary tail wheel transporter of FIG. 14, according to a second preferred embodiment of the present invention.

FIG. 15 is a front-left perspective view illustrating the exemplary embodiment for the exemplary tail wheel transporter 1400 of FIG. 14, according to another preferred embodiment of the present invention. Spacers 1452 may be used between frame member 104 and pivot bar 1434 to provide space for free bar 1450. Fixed stud 1428 can be more clearly seen as the axle of pivot 1430. Variations in the relative lengths of the four bar mechanism are within the scope of the invention. While the exemplary embodiments are manually operated, motorized embodiments are also within the scope of the invention.

Figure 16:
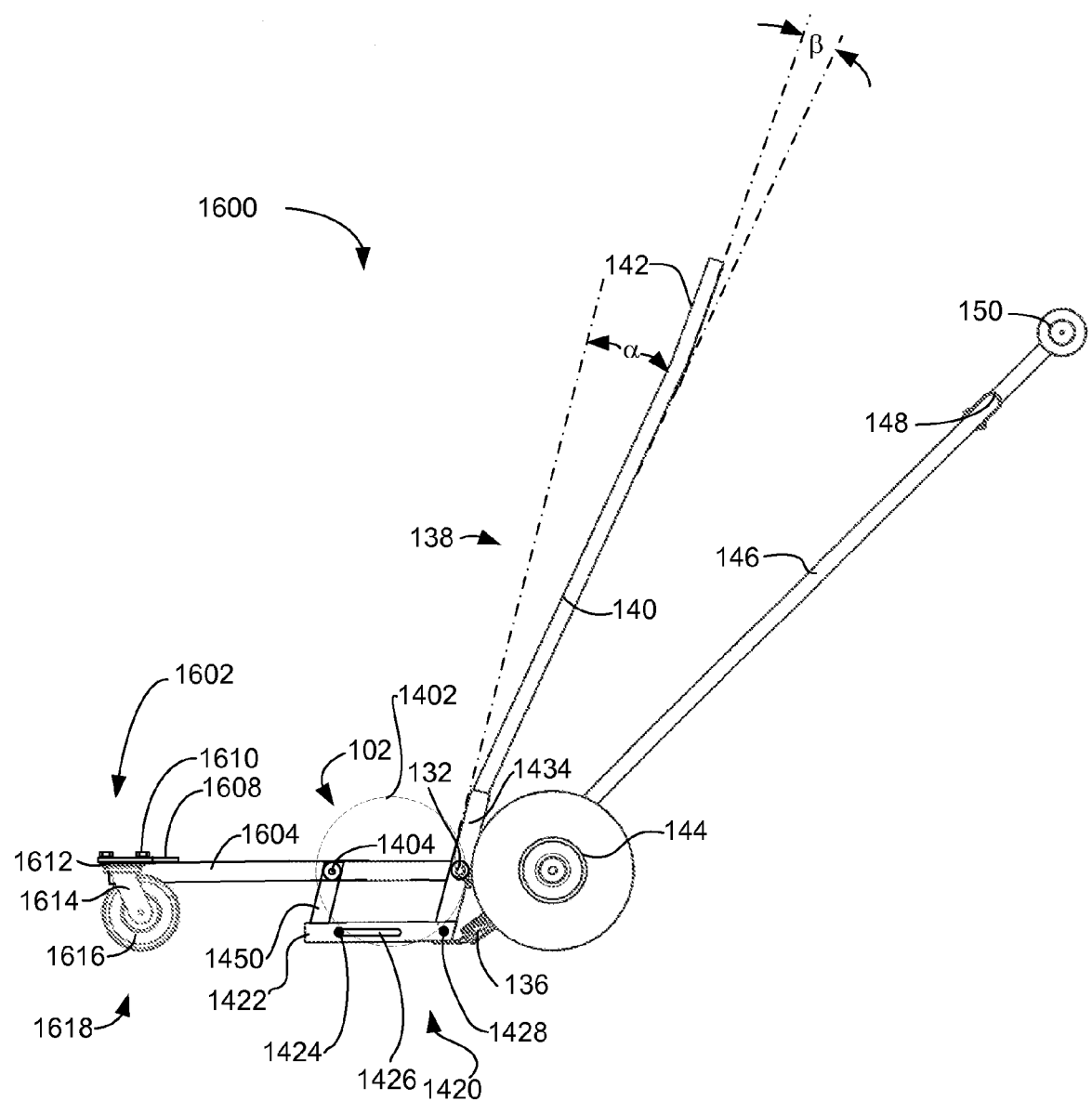
FIG. 16 is a side elevation view illustrating an additional exemplary embodiment of a tail wheel transporter, according to a preferred embodiment of the present invention.

FIG. 16 is a side elevation view illustrating an additional exemplary embodiment of a tail wheel transporter 1600, according to a preferred embodiment of the present invention. Tail wheel transporter 1600 features the four bar mechanism 1604, 1450, 1422, and 1434 as tail wheel transporter 1400, but differs in having a low-profile front end 1602. Low-profile front end 1602 includes a caster support plate 1608 fixed (preferably welded) to the top surface of frame member 1604 proximate the front end of the frame member 1604. Caster support plate 1608 supports two casters 1618 (one visible in this view) each having a wheel 1616 and a pair (one visible in this view) of wheel support arms 1614 that are rotationally coupled to a caster mounting plate 1612. The caster mounting plate 1612 is releasably fixed to the caster support plate 1608 with fasteners 1610, illustrated as bolts 1610 (one of two labeled). Frame member 1604 is illustrated as straight, but the invention is not so limited. Caster support plate 1608 is illustrated as flat, but the invention is not so limited. The advantage of the low profile front end 1602 is that it allows the tail wheel transporter 1600 to be used in situations where there is low clearance under the aircraft or other vehicle. Using dual casters 1618 spreads the load, allowing smaller casters 1618 to be used.

Figure 17:
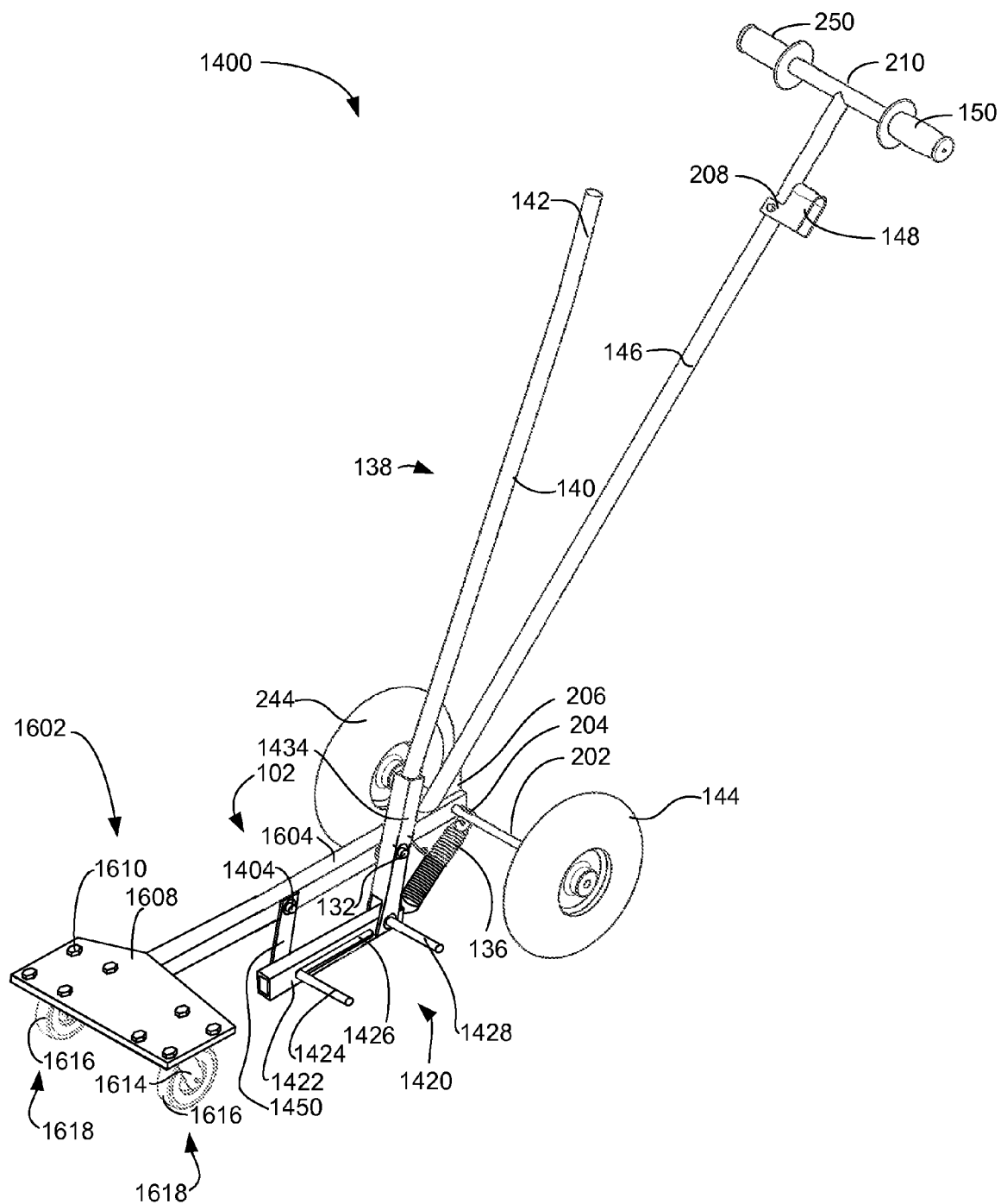
FIG. 17 is a front-left perspective view illustrating the exemplary embodiment for the exemplary tail wheel transporter of FIG. 16, according to a second preferred embodiment of the present invention.

FIG. 17 is a front-left perspective view illustrating the exemplary embodiment for the exemplary tail wheel transporter 1600 of FIG. 16, according to a second preferred embodiment of the present invention. All eight bolts 1610 (one of eight labeled) can be more clearly seen, along with dual casters 1618. The illustrated shape of caster support plate 1608 is not a limitation of the invention. Tail wheel transporter 1600 still uses a tricycle carriage but has bifurcated front wheels 1618.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. For example, and embodiment in which the rear wheels are casters and the front wheel is fixed is contemplated. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A tail wheel transporter comprising:
   a. a tricycle carriage further comprising a main frame extending off-centered from a rear axle to a front caster attachment plate;
   b. a pivot bar pivotably mounted to a side of said main frame proximate a centerline orthogonal to said rear axle;
   c. a lifting foot pivotably coupled to said pivot bar and extending horizontally, when in a quiescent state, from said pivot bar to a point behind said front caster attachment plate, wherein said main frame, said pivot bar, and said lifting foot are three bars of a four bar mechanism;
   d. a lifting arm extending from said pivot bar;
   e. a towing arm extending from said main frame; and
   f. a latch operable to releasably couple said lifting arm to said towing arm when said lifting arm is in a lifted position.

2. The tail wheel transporter of claim 1, further comprising a biasing mechanism operable to bias said lifting foot toward a non-lifted position.

3. The tail wheel transporter of claim 1, further comprising a fourth bar of said four bar mechanism pivotably coupled on first and second ends to said main frame and said lifting foot, respectively.

4. The tail wheel transporter of claim 1, wherein said lifting foot further comprises a first stud extending sideways from said lifting foot across said centerline.

5. The tail wheel transporter of claim 4, wherein said first stud further comprises an axle for one pivotable coupling of said four bar mechanism.

6. The tail wheel transporter of claim 5, where the lifting foot further comprises a second stud extending sideways from said lifting foot across said centerline and having an adjustable position on said lifting foot.

7. The tail wheel transporter of claim 6, wherein said adjustable position comprises a slider mechanism operable to adjust the position of said second stud at various positions along a slot of said slider mechanism.

8. The tail wheel transporter of claim 7, wherein said slider mechanism comprises:
   a. said slot along at least a portion of a centerline-proximal side of said lifting foot;
   b. an axial channel within said lifting foot;
   c. a slider block operable to slide within said axial channel, wherein said slider block comprises:
      i. a first threaded bore alignable to said slot and operable to receive a threaded end of said second stud; and
      ii. a second threaded bore alignable to said slot and operable to receive a set screw.

9. The tail wheel transporter of claim 6, wherein said tail wheel transporter is configured to receive the force of a wheel to be transported on said first and second studs of said lifting foot at a vertical position below said rear axle when said lifting foot is in a lifted position.

10. The tail wheel transporter of claim 1, wherein said four bar mechanism comprises a parallelogram configuration.

11. The tail wheel transporter of claim 1, wherein said carriage comprises a bifurcated front wheel.

12. The tail wheel transporter of claim 1, wherein said lifting arm comprises first and second releasable and re-connectable sections.

13. The tail wheel transporter of claim 12, wherein said towing arm comprises first and second releasable and re-connectable sections.

14. The tail wheel transporter of claim 1, wherein said four bar mechanism further comprises a fourth bar pivotably coupled at a first end to said main frame and pivotably coupled at a second end to a front end of said lifting foot.

15. A tail wheel transporter comprising:
   a. a carriage further comprising a main frame extending off-centered from a rear axle to a front caster attachment plate and a bifurcated front wheel;
   b. a pivot bar pivotably mounted to a side of said main frame proximate a centerline orthogonal to said rear axle;
   c. a lifting foot pivotably coupled to said pivot bar and extending horizontally, when in a quiescent state, from said pivot bar to a point behind said front caster attachment plate, wherein said main frame, said lifting foot, and said pivot bar comprise three bars of a four bar mechanism;
   d. a lifting arm extending from said pivot bar;
   e. a towing arm extending from said main frame;
   f. a latch operable to releasably couple said lifting arm to said towing arm when said lifting arm is in a lifted position;
   g. said lifting foot comprising a first stud extending sideways across said centerline from said lifting foot;
   h. said lifting foot comprising a second stud extending sideways from said lifting foot across said centerline and having an adjustable position on said lifting foot; and
   i. wherein said tail wheel transporter is configured to receive the force of a wheel to be transported on said first and second studs of said lifting foot at a vertical position below said rear axle when said lifting foot is in a lifted position.

16. The tail wheel transporter of claim 15, wherein said adjustable position comprises at least one of:
   a. a plurality of threaded bores in said lifting foot, wherein each bore of said plurality of threaded bores is operable to receive a threaded end of said second stud; and
   b. a slider mechanism operable to adjust the position of said second stud at various positions along a slot of said slider mechanism.

17. The tail wheel transporter of claim 16, wherein said slider mechanism comprises:
   a. said slot along at least a portion of a centerline-proximal side of said lifting foot;
   b. an axial channel within said lifting foot;
   c. a slider block operable to slide within said axial channel, wherein said slider block comprises:
      i. a first threaded bore alignable to said slot and operable to receive a threaded end of said second stud; and
      ii. a second threaded bore alignable to said slot and operable to receive a set screw.

18. A tail wheel transporter comprising:
   a. a tricycle carriage further comprising a main frame extending off-centered from a rear axle to a front caster attachment plate;
   b. a pivot bar pivotably mounted to a side of said main frame proximate a centerline orthogonal to said rear axle;
   c. a lifting foot pivotably coupled to said pivot bar as two bars of a four-bar mechanism;
   d. a biasing mechanism operable to bias said lifting foot toward a non-lifted position;
   e. a lifting arm extending from said pivot bar;
   f. a towing arm extending from said main frame;
   g. a latch operable to releasably couple said lifting arm to said towing arm when said lifting arm is in a lifted position;
   h. wherein said lifting foot comprises a first stud extending sideways from said lifting foot across said centerline;

i. wherein said lifting foot further comprises a second stud extending sideways from said lifting foot across said centerline and having an adjustable position on said lifting foot; and
j. wherein said tail wheel transporter is configured to receive the force of a wheel to be transported on said lifting foot at a vertical position below said rear axle when said lifting foot is in a lifted position.

19. The tail wheel transporter of claim 18, wherein said adjustable position comprises at least one of:
   a. a plurality of threaded bores in said lifting foot, wherein each bore of said plurality of threaded bores is operable to receive a threaded end of said second stud; and
   b. a slider mechanism operable to adjust the position of said second stud at various positions along a slot of said slider mechanism;
   c. wherein said slider mechanism comprises:
      i. said slot along at least a portion of a centerline-proximal side of said lifting foot;
      ii. an axial channel within said lifting foot;
      iii. a slider block operable to slide within said axial channel, wherein said slider block comprises:
         1. a first threaded bore alignable to said slot and operable to receive a threaded end of said second stud; and
         2. a second threaded bore alignable to said slot and operable to receive a set screw.

20. The tail wheel transporter of claim 18, wherein said carriage comprises a bifurcated front wheel.

* * * * *